US006499100B1

(12) United States Patent
Halvarsson et al.

(10) Patent No.: US 6,499,100 B1
(45) Date of Patent: Dec. 24, 2002

(54) ENHANCED INSTRUCTION DECODING

(75) Inventors: Dan Halvarsson, Stockholm (SE); Tomas Jonsson, Södertälje (SE); Per Holmberg, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/580,499

(22) Filed: May 30, 2000

Related U.S. Application Data (63) Continuation of application No. PCT/SE98/02210, filed on Dec. 2, 1998.

(30) Foreign Application Priority Data

Dec. 2, 1997 (SE) .............................................. 9704476

(51) Int. Cl.$^7$ ............................. G06F 9/30; G06F 9/455
(52) U.S. Cl. ........................... 712/210; 712/41; 712/24
(58) Field of Search ........................ 712/244, 23, 226,
712/228, 233, 210, 234, 209, 245, 213,
246, 247, 212, 248, 217, 300, 219, 41,
218, 42, 223, 43, 24, 38; 711/123, 122,
129, 169, 131, 130

(56) References Cited

U.S. PATENT DOCUMENTS

| 4,489,395 A | * 12/1984 | Sato ............................ 712/38 |
| 4,791,559 A | 12/1988 | Byers |
| 5,243,705 A | * 9/1993 | Nakagawa ................... 712/228 |
| 5,586,277 A | 12/1996 | Brown et al. .................. 712/23 |
| 5,740,392 A | 4/1998 | Brennan ..................... 712/210 |
| 5,758,116 A | 5/1998 | Lee et al. ................... 712/210 |
| 5,764,971 A | * 6/1998 | Shang et al. ................ 712/244 |
| 5,799,138 A | * 8/1998 | Yoshida ..................... 712/210 |
| 5,819,056 A | 10/1998 | Favor ........................ 712/204 |
| 5,845,099 A | 12/1998 | Krishnamurthy et al. ... 712/204 |

FOREIGN PATENT DOCUMENTS

| EP | 0 475 919 | 3/1992 |
| WO | 97/24659 | 7/1997 |
| WO | 97/48041 | 12/1997 |
| WO | 99/28818 | 6/1999 |

OTHER PUBLICATIONS

Intel 486 Dx Microprocessor Data Book, Jun. 1991, total pages 4, pp. 154 & 165.
The 14$^{th}$ Annual International Symposium on Computer Architecture, Jun. 1987, Pittsburgh, Pennsylvania, David R. Ditzel et al., "The Hardware Architecture of the CRISP Microprocessor," pp. 309–319.

* cited by examiner

Primary Examiner—Daniel H. Pan
(74) Attorney, Agent, or Firm—Nixon & Vanderhye, PC (57) ABSTRACT

When decoding instructions of a program to be executed in a central processing unit comprising pipelining facilities for fast instruction decoding, part of the decoding is executed or the decoding in pipelining units is prepared in a remapping unit during loading a program into a program or primary memory used by the central processor, the remapping or predecoding operation resulting in operation codes which can be very rapidly interpreted by the pipelining units of the central processor. Thus, the operation code field of an instruction is changed to include information on e.g., instruction length, jumps, parameters, etc., this information indicating the instruction length, whether it is a jump instruction or has a parameter etc. respectively, in a direct way that allows the use of simple combinatorial circuits in the pipelining units. This makes it possible to obtain a decoding of complex instructions using few clock cycles, and also that old type instructions can be used as input to the system without degrading the time performance of the instruction decoding. Also, accesses of the program memory and a data memory can be made earlier during execution of a program, which saves execution time.

31 Claims, 8 Drawing Sheets

ENHANCED INSTRUCTION DECODING

This is a continuation of PCT application No. PCT/SE98/02210, filed Dec. 2, 1998, now WO9928818, the entire content of which is hereby incorporated by reference in this application.

TECHNICAL FIELD

The present invention relates to a digital computer and a digital processor and in particular a pipelining unit or program code translation unit used twin and also to a method performed by a digital processor, in particular the procedure for decoding instructions to be executed by the processor, and to a method and device for loading instructions to the processor.

BACKGROUND

When designing a modern, fast, central processor unit (CPU), one important technique used is pipelining allowing a fast execution of instructions by the processor unit. In pipelining the execution of an instruction can overlap the execution of instructions following after the considered instruction. Such a processor has a pipelining unit or execution pipeline in which an instruction is completed in several substeps. Each substep is connected to the next substep, thereby forming a "pipe" in which instructions enter in one end, are processed in the substeps or stages, and exit at the other end. The implementation of an execution pipeline therefore makes it possible to execute portions of several instructions at the same time, in different substeps of the pipeline.

Furthermore, modern processors tend to be optimized for execution of simple instructions having fixed lengths and two or three operands, so called Reduced Instruction Set Computer (RISC)-type instructions. As conventional, an instruction always contains an operation code or op-code and the operands are fixed data, memory addresses for e.g. jumps, other parameters for accessing a memory, etc.

When running an instruction designed for a conventional complex instruction set computer (CISC) in such a modern processor, which is optimized for RISC-style instructions, i.e. for instructions which all can be executed in a time period having a fixed length, the execution in the pipeline must be provided with a number of additional sub-steps in order to adapt the CISC-type instruction for execution in the processor designed for RISC-style instructions.

Conventionally, digital processors execute the instructions in definite clock cycles, as defined by clocking signals or clock pulses and having a suitable length, the clock cycles being provided by an oscillator. Usually, during one clock cycle, there is time for one memory access or for one arithmetic/logic operation. Also the processing made in the pipelining units of the processor is determined by the clock cycles (or clock pulses). In order to avoid some of the clock cycles associated with the additional substeps, which are required for adapting CISC-type instructions to be executed in a processor designed for RISC-style instructions, it would be necessary to have, at an early stage of the decoding an instruction, knowledge of the length of the instruction and also whether or not the instruction involves a jump parameter or memory access parameters, thus before the operation code of the instruction is decoded and the actual or detailed operation to be executed is determined.

In order to run instructions at a very high speed in an execution pipeline, the common solution today is to execute the decoding of instructions in several steps in the execution pipeline. As an optimisation, some of the decoding of instructions can be carried out in advance and a decoded instruction is then stored in an instruction cache memory. Such an approach is usually called pre-decoding. The result of the pre-decoding comprises some additional information stored in an instruction cache memory, so called pre-decoded bits. One major drawback associated with the use of pre-decode bits is that, since more bits are used, the size of the instruction cache memory must be increased. Also, it is common to perform, during the same clock cycle, i.e. nearly simultaneously, the decoding of more than one instruction in an execution pipeline.

In a computer designed for special tasks such as a computer controlling or actually being the main part of a large telephone switch, a very high quantity of program code may be used and various program modules used by the computer can have been developed during a rather extended time period. Each program module can be designed for a special purpose or performing specialized tasks and have a high degree of complexity. The modules can have been written in different versions of assembler language and/or processed by different versions of assemblers/compilers generating program code which may slightly differ from one program module to another, the generated code e.g. being adapted to be executed at high speed by the processor used at the time when the original program module was developed. Then there is naturally a desire of reusing older versions without having to develop new program code, where the reused code still can be processed at high speed by newer processors. A special requirement may then be that each modified instruction should have the same length as the original one, since the older program code has been designed to fit into the memory and into addressing system used in the computer and that the addressing systems should be the same, even if fields located inside an instruction and containing operation codes, memory references, addresses and similar items can be relocated inside the instruction. Thus, the addresses used in memory references in the instructions should not be changed and the address of each instruction should not be changed.

In the published International patent application WO 97/24659 a method for fast decoding special instructions is disclosed. The length of program instructions is found in a complex manner requiring that a sufficient number of bytes are first received, then that the bytes are detected and removed which contribute no length information and finally that the remaining instruction bytes are decoded. In David R. Ditzel and Alan D. Berenbaum, "The Hardware Architecture of the Crisp Microprocessor", 14th Annual International Symposium on Computer Architecture, Jun. 2–5, 1987, Pittsburgh, pp. 309–319, an instruction format allowing a fast decoding of instruction length is disclosed. In the first two bits of each instruction the length of the instruction is encoded, the length varying between tee different values.

In the published European patent application 0 475 919 a set of instructions for a digital computer is disclosed. In the instructions a flag in the eighth bit indicates that the contents of a particular register should be entered in the fetch queue. In U.S. Pat. No. 4,791,559 an instruction flow control system is disclosed in which a remapping of instructions is made.

SUMMARY

It is an object of the present invention to overcome the problems as outlined above and in particular to reduce the number of clock cycles used for instruction decoding to during program execution in a digital processor without the need for an increased instruction cache memory or the need for making the decoding in several steps in a pipelining unit for the processor.

One problem which the invention tries to solve is how to make the decoding of instructions to be executed by a processor and how to configure the instructions so that various steps of decoding the instructions are made as fast and as little complicated as possible.

The object as outlined above and others are obtained by a method and a device for improving the execution of instructions in processors designed for RISC-style instructions, without a need for a pre-decoding step and an increased size of the instruction cache memory. The method and the device also improves run time performance compared to prior known solutions.

Thus, when loading the instructions into the program memory from an external program memory, such as a tape, the instructions are modified. This is performed by means of a recoding procedure, according to which the instructions are changed or remapped.

The object of the remapping is to add, without increasing the number of bits in the instruction, i.e. the instruction length, information not present in the operation code field of the instruction, but which is useful when running the instructions in a processor designed for fixed-length instructions. The reason for this is that fewer sub-steps need to be executed in the pipeline, since fewer additional steps are required for the instruction decoding in the execution pipeline, or equivalently that simpler and faster circuits can be used in the execution pipeline.

The code remapping of the instruction comprises two different parts:

remapping the operation code in order to make the instruction carry more information, in particular more direct information that can be more easily decoded. Such information can comprise: instruction length, information on whether or not the instruction involves a jump or memory access, i.e. whether the instruction contains memory references or addresses to a memory, the existence of certain operands or parameters in the instruction, the length of such operands or parameters, etc.

relocation of parameters or operands, so that a parameter or operand, which is directly referred to by a bit in the remapped operation code, is located in a standard or predetermined position in the instruction, this position possibly being dependent on the length of the instruction.

Hence, if possible, the original operation code field, for example consisting of at least four and up to twelve bits in typical processors as considered herein, in which field the instruction is specified, is remapped or transformed in order to make the instruction code field carry information which can be directly decoded.

The possibility to read the length of an instruction directly from the operation code makes it possible to tanslate two instructions during the same clock cycle.

Efficient execution of program code in a processor is thus achieved, also for program code of previous or older types, intended for former versions of processors. The program code for former versions is converted, either in a separate code processing step or by the processor itself, when the old program is loaded into a primary memory used by the processor. In the conversion each instruction is modified so that it will be better adapted to the operation of the processor.

Operation codes, parameters and constants can be displaced or relocated inside each instruction and the operation codes can be changed so that they will also contain some additional information or generally, information that allows a more rapid decoding, the modification always being made preserving the length of the instruction.

The operation codes can then be designed to include a simple, direct indication of the length of an instruction and also direct indications whether the instruction contains particular parameters. Such indications then always have definite places in the operation code so that they can be easily accessed by the processor in an early stage of the execution of an instruction. The definite places are preferably counted from that position of the instruction which is first read from the memory, when executing the instructions. That position can be called the start position or start bit of the instruction. When illustrating instructions in drawings, that position is generally identical to the position of the least significant bit of the instruction.

The direct indications in the instructions are made by setting or resetting predetermined bits in the instructions. In particular, the length indication can be made by setting a bit in the instruction, the place of the bit indicating the length of the instruction, the place being counted from a predetermined position in the instruction such as the start of the instruction. Then all the bits between the bit indicating the length and the predetermined position are reset or equivalently worded all bits as counted from the predetermined position in a predetermined direction up to the set bit indicating the length are reset.

The part of the processor making the decoding or translation of instructions will then have to be modified accordingly, to be adapted to the new instruction format. The modified instructions will then allow a very rapid and easy decoding, using a minimum number of gates in the decoding part.

BRIEF DESCRIPTION OF THE DRAWINGS

The present invention will now be described in detail by way of non-liming examples with reference to the accompanying drawings, in which.

DETAILED DESCRIPTION

Figure 1:
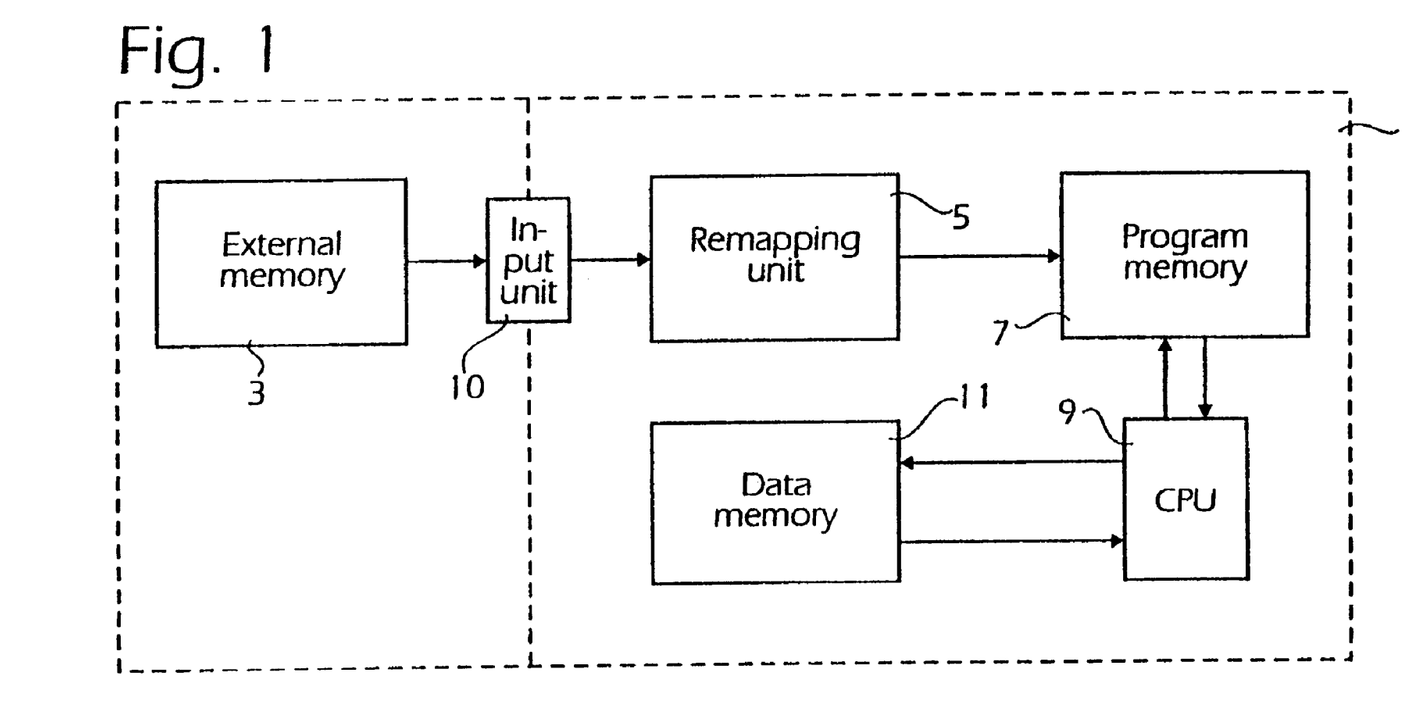
FIG. 1 is a general view illustating a computer system.

In FIG. 1 a schematic view of a computer 1 is shown. The system 1 comprises an external memory 3 connected to a remapping unit 5. The remapping unit 5 is also connected to a program memory 7 used by a central processing unit, CPU 9. In a preferred embodiment the external memory 3 is a magnetic tape carrying a plurality of program modules written in various versions of assembler or machine language. The magnetic tape can be read by an input device 10 such as tape drive unit included in the computer 1 as commanded by e.g. some operator input. The CPU then starts to execute a remapping program constituting the remapping unit 5, the program e.g. being the first program read from the tape 3. The program may for example first sense the configuration of the computer and in particular the type of processor used and the kind of instructions used by the processor in order to find the correct remapping code to be used. The remapping program then reads the program modules as stored on the tape, finding out the type of assembler or machine language used by each module, processes the program code of the modules and detects the instructions thereof translating them to new instructions using the information of the language used in the program code read and the type of processor sensed. Each instruction of the original program code read is then translated to a new instruction thus being adapted to the CPU 9 of the computer, the new instruction having the same length and the same position or address in the sequential order of the program code, the new instruction also having basically the same operands as the old one but they may have obtained new positions inside the instruction and furthermore having a new operation code placed in a fixed position in the new instruction. The new instructions are stored in the program memory 7 which is the active memory of the computer, typical a dynamic RAM memory allowing a rapid access of stored data, having the capability of storing a large number of programs or program modules simultaneously or equivalently a large number of program code lines. Thus, the computer has always all the programs which can be executed in its primary memory, no swapping of programs or similar methods being used when a new program is to be executed. Thus, all programs used by the CPU 9 can be said to be resident in the active memory or plainly memory resident.

In the general case the external memory can be any land of memory, such as part of a large memory, which also contains the program memory 7 and the data memory 9. Then the input unit 10 illustrated in FIG. 1 will correspond to a copying operation made between the part of the large memory holding the old programs to be reused and the part of the large memory constituting the primary memory or program memory of the CPU 9.

During the load of a program into the program memory, the system 1 first fetches the program to be executed from the external memory 3. The program is fed to the remapping unit 5 in which the original code is remapped, for example in the manner described below in conjunction with FIG. 4. Thereupon the remapped code is fed to the program memory 7 used by the CPU 9 of the computer 1. The CPU 9 then uses the remapped code during execution of the program.

If the remapping is performed in a suitable manner the remapped version of the original code can be made more optimized for the actually used CPU 9, and thereby make the execution in the CPU 9 more efficient and thus faster. Hence, the remapping of the original code can make it possible to obtain decoding of instructions using fewer substeps in an execution pipeline used in the CPU 9, thereby achieving that the actual execution of the program requires fewer clock cycles.

Furthermore, data and program memories may be accessed earlier during execution of a program if the address information thereof in the instructions is in a suitable way written therein by the remapping unit 5, which will also save execution time. The way of writing the address information is thus chosen in order to facilitate the method of accessing this information and in particular the address information can be entered in the instructions so that it is directly and easily accessible at an early stage of executing the instructions.

In an embodiment of a computer suited as a processor for a telecommunication switch which will now be described in some detail the original code, i.e. the code, which is to be remapped and is entered from the external memory, has instructions only of lengths 16, 32, 48 and 64 bits or equivalently, of one, two, three or four words, the term word thus signifying 16 bits. The program memory contains a plurality of blocks of 64 kilowords of 16 bits, each such block basically holding one program module. Furthermore, the instructions of the original code can as is conventional comprise parameters or operands, in the considered embodiment at least two different kinds of parameters or operands being used, one kind of parameter, an "a-parameter" referring to an address table stored in the program memory for accessing specific fields or even files in the data memory, and another kind, an "n-parameter" referring to a jump in the program memory indicating in some way the address to which the execution is to jump after executing the instruction in which the n-parameter is located. During the preparation of instructions, at an early stage before the actual execution of a considered instruction containing such an operand, the corresponding parameter should be accessed or at least the exact address of memory cell to which the parameter refers should have been calculated, in the case where the computer uses some special addressing methods. Thus, an early knowledge of n- and a-parameters, both the existence thereof, the locations thereof inside the instructions and the actual parameters, facilitates the execution in the execution pipeline and thereby saves execution time, as will be described hereinafter.

Thus, as has been already described, an a-parameter is an address parameter used to is access a reference table stored in the program memory and containing information, which is used to calculate an address in the data memory 11 in the system. In the embodiments described herein, an instruction of length 16 bits can have an a-parameter of length six or eight bits and an a-parameter in an instruction of length 32 bits comprises either eight or twelve bits. An instruction of length 48 or 64 always has an a-parameter containing twelve bits in the case where the instruction comprises an a-parameter.

An n-parameter is an address of length 16 bits used by jump instructions in the program code for jumps within the same 64 kilowords block in the program memory, such a block usually holding one program module as has been described above.

In FIGS. 2a–2l a code remapping scheme for obtaining efficient new code is illustrated for typical instructions. It can be directly observed from the figures that the lengths of the instructions are preserved during the remapping and that the parameter fields are made to have the same location in all similar instructions.

Figure 2A:
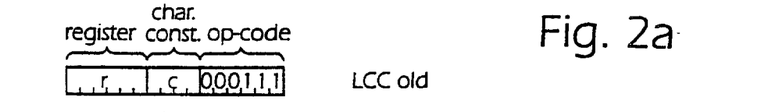
FIGS. 2a–2l illustrate the remapping of some common instructions.
Figures 2B, 2C:
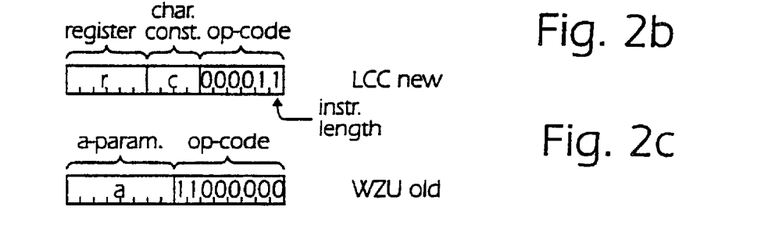

In FIGS. 2a, 2b a remapping of a one-word instruction is illustrated, the instruction being call Load Character Constant and having the mnemonic LCC. This instruction performs a load of a register with a four bit constant located inside the instruction. The operation code is contained in the six least significant bits (LSBs). The bits can be given position numbers or sequential order numbers 0, 1, ..., 15 stating from the LSB, i.e. from the start of the instruction as defined above. The operation code is then for this instruction contained in bits 0–5. Direct data in the shape of a character constant c is as contained in the four following bits, i.e. in bits 6–9. A register number r is contained in the following remaining bits 10–15, the number r denoting a register in a register file which is associated with or comprised in the CPU 9, the bits allowing an addressing of up to 64 different registers. For this instruction the fields are not relocated within the instruction in the remapping but only the operation code field is modified. For a 16 bit instruction the operation code field will after remapping always have a binary "1" in the least significant position signifying an instruction of length of one word or 16 bits. The rest of the operation code field contains after remapping some bits having direct reference to the parameters and the lengths thereof and also bits signifying the actual or proper new operation code to be used for finding the corresponding microinstructions, as will be described hereinafter.

In FIGS. 2c and 2b is illustrated the remapping of another 16 bit instruction on called Write Zeros having the mnemonic WZU. This instruction resets all bits of a position in the data memory indicated by an a-parameter. Both the old and new instruction have a field of eight bits for the operation code in the lowest bit positions Nos. 0–7 and a field of eight bits for the a-parameter in positions Nos. 8–15. The new instruction has a binary "1" in the least significant bitposition, i.e. in bit No. 0, signifying a one-word instruction.

Figure 2D:
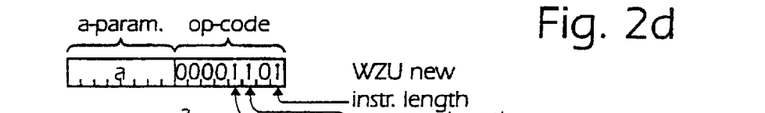
Figure 2E:
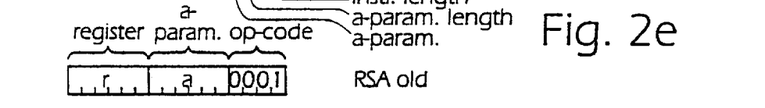
Figures 2F, 2G, 2H:
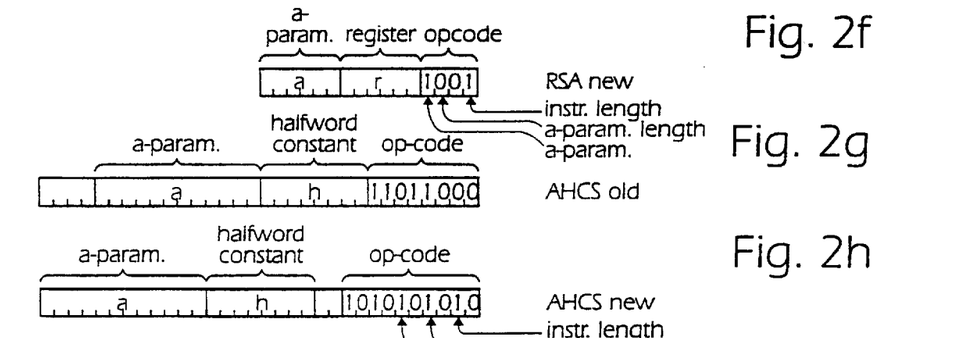

Furthermore, in FIGS. 2e, 2f another one-word instruction is illustrated before and after remapping. This instruction is called Read from Store Address having the mnemonic RSA. The original instruction has an operation code field of 4 bits in bits 0–3, an a-parameter field of six bits in bits Nos. 4–9 and a register number field of six bits in bits Nos. 10–15. After the remapping the new instruction has a new operation code in the same field as before in bits Nos. 0–3 but the a-parameter field and the register field have changed their places for each other, so that now the register field is in bits 4–10 and the a-parameter field is in bit Nos. 11–15. The new operation code field has a binary "1" in bit No. 0 signifying a one-word instruction.

In the new operation codes in FIGS. 2b, 2d, 2f the bit No. 3 signifies whether the instruction has an a-parameter, i.e. if bit No. 3 is equal to a binary "1" the instruction has an a-parameter and otherwise it has no a-parameter. Furthermore, bit No. 2 signifies whether the a-parameter has a length of eight bits, i.e. if bit No. 2 is equal to a binary "1" the a-parameter has this length and if the bit No. 2 is equal to a binary "0" the a parameter has a length of six bits.

In FIGS. 2g–2l examples are illustrated of the remapping of two-word instructions, the principles of the remapping being the same as explained with reference to FIGS. 2a–2f. In FIGS. 2g, 2h the format of the instruction Add Halfword Constant to Store is shown having the mnemonic AHCS. The old instruction has its operation code in bits Nos. 0–7, i.e. a length of eight bits, a halfword direct data constant in bits 8–15 and an a-parameter of length twelve bits in bits Nos. 16–27. It should be observed that the a-parameter field is not located left-adjusted in the instruction since bits in the positions Nos. 28–31 are not used. In the instruction after remapping as shown in FIG. 2h the operation field has been prolonged to 10 bits and still resides in the right-most position in the instruction. The data field and the a-parameter field have been moved by a step of four bits so that now the a-parameter occupies the most significant bits of the instruction, i.e. the bits Nos. 20–31, and the constant field is located directly at the side of, in the bits Nos. 12–19. The instruction length is directly provided by the two least significant bits of the instruction after recoding, the positions Nos. 0 and 1 now having a binary "0" and a binary "1" respectively signifying a two-word instruction. General thus, the position of the first binary "1" taken from the least significant bit of the instruction gives the length of the instruction.

Figure 2I:
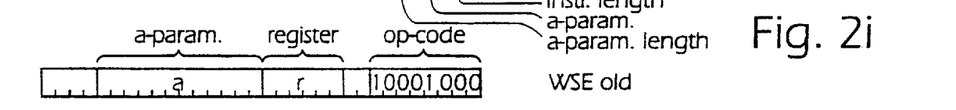
Figure 2J:
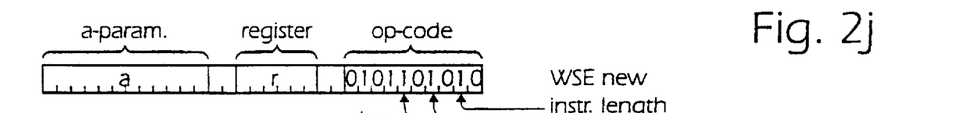

In FIGS. 2i, 2j the recoding of the instruction WSE: Write to Store Extended is shown. This instruction has before remapping its operation code in bits Nos. 0–7, a register number r in a field occupying bits Nos. 10–15 and an a-parameter in bits Nos. 16–27. After remapping the new operation code is in bits 0–9, the register number is located in bit positions Nos. 10–17 and the a-parameter is moved to occupy the most significant bits of the instruction, i.e. to bits Nos. 20–31. The instruction length is given by a binary "0" in position No. 0 and a binary "1" in position No. 1.

Figure 2K:
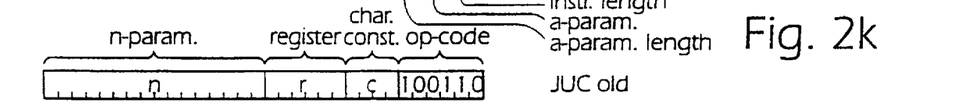
Figure 2L:
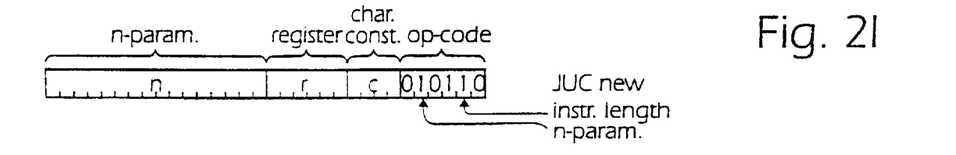

The instruction illustrated in FIGS. 2k, 2l is Jump on Unequality to Character constant, JUC, and has before recoding an operation code field in bit positions Nos. 0–5, a character direct constant c in bit positions Nos. 6–9, a register number r in a field in bit positions Nos. 10–15 and an n-parameter in bit positions Nos. 16–31. After recoding the locations of the various fields are the same and only the operation code has been changed. The operation code will now directly as described above indicate the length of the instruction.

Like the one-word instructions described in conjunction with FIGS. 2a–2f the existence of an a-parameter is indicated directly by one particular bit being set in the new operation code, the bit having position No. 3. The length of the a-parameter field is given by bit No. 5. If bit 5 is set, the a-parameter has a length of twelve bits, if it is not set the length is eight bits. An instruction having an n-parameter is indicated by bit No. 4 being set in the remapped code.

Looking for instance once more at the example illustrated in FIGS. 2a, 2b we find that bit No. 3 is set to binary 0 indicating that the instruction does not contain an a-parameter. It is also seen that the operation code of the instruction is changed. By using a look-up table additional information is added in the field of the new operation code by setting some additional bits. In this case e.g. the bits Nos. 1 and 5 can be used since they are not used for the direct indication of parameters as described above. Hence, in this case, bit No. 1 is set, thereby creating a unique identification for the remapped instruction, which then can be correctly decoded. The corresponding unique identification is provided for all possible instructions in such a look-up table, whereby each original instruction code can be remapped into a remapped instruction code, without loosing the unique identity for each instruction.

Thus, the remapping procedure utilizes the fact that the operation code fields in the original instructions do not carry an optimum of information. In fact, some bits in the original operation code may in some cases carry no information at all.

Figure 3:
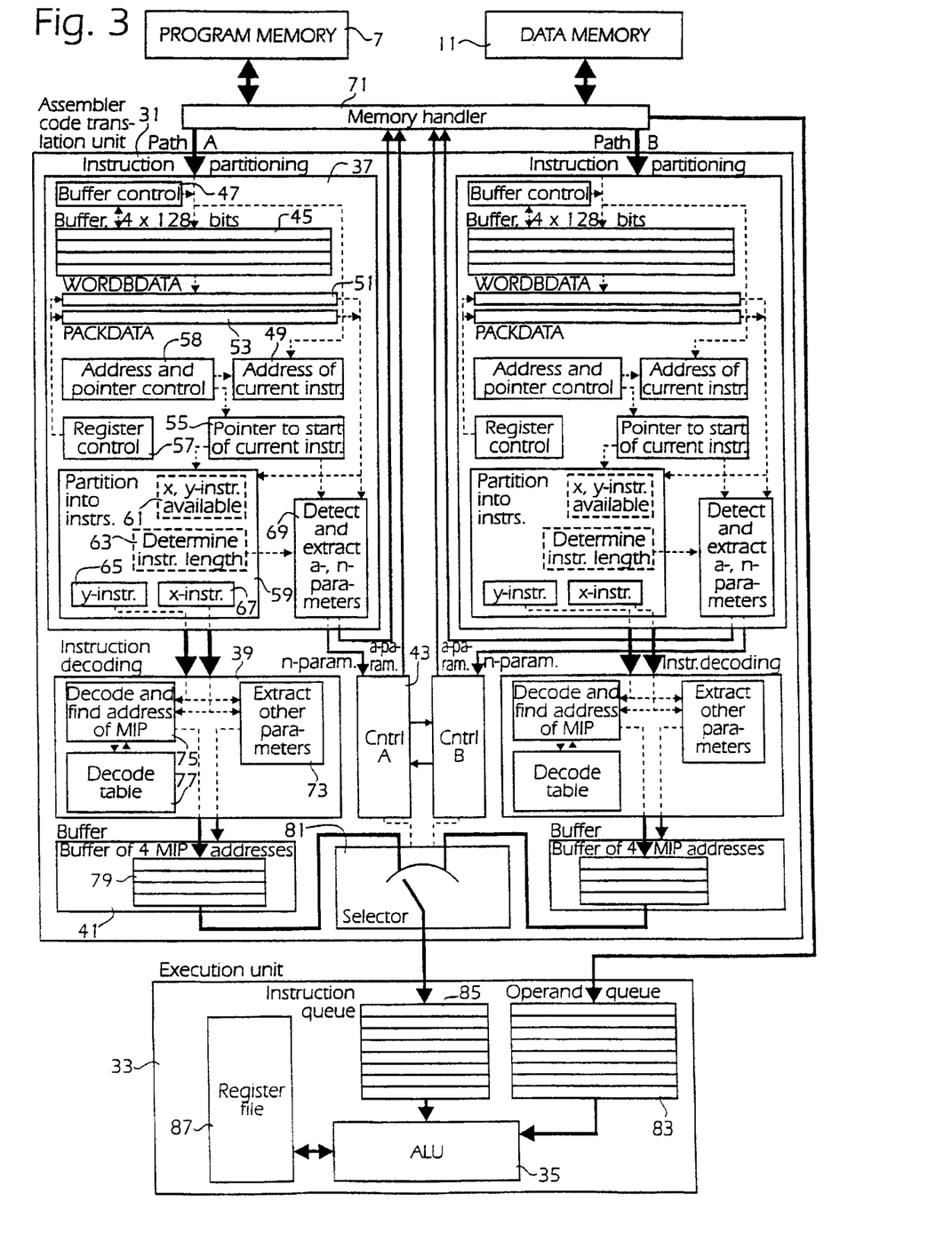
FIG. 3 is block diagram of a processor.

In the block diagram of FIG. 3 the essential parts of an assembler code translating unit 31 are shown, the translating unit 31 being included in the CPU 9 of FIG. 1 together with an execution unit 33 containing the arithmetic/logic unit 35 executing the instructions. The translating unit 31 has two parallel data paths, path A and path B, which make a preprocessing of the instructions to be executed in the ALU 35, preparing the instructions and delivering them in a queue so that the ALU 35 can execute them as fast as possible. Each path A, B has an instruction partitioning unit 37, an instruction decoding unit 39 and a buffer unit 41 which are associated with a control unit 43, one for each path. The cooperating control units 43 handles the choice of current path, i.e. the choice of the path, path A or path B, from which instructions to be executed by the ALU 35 are taken and they thus receives information on jump instructions and similar instructions.

The instruction partitioning unit 37 has an input buffer 45, a kind of instruction cache memory holding four 128 bit registers, the buffer thus being adapted to receive at is most four lines of program code, each line containing 128 bits or eight words, each of these lines always holding successive data as fetched from successive positions in the program memory 7. The positions in the program memory 7, from which program code is read to be stored in one of the registers of the instruction cache memory 45, are always aligned with block and word borders in the program memory, in particular so that the start position of such a line to be read has an address in the program memory 7 which is a multiple of 128. A buffer control unit 47 for controlling the buffer 45 handles the loading of the instruction buffer 43 so that the buffer always holds at least three lines of program code and it receives commands from the respective path control unit 43. The address of the current instruction processed in the instruction partitioning unit 37 is always stored in a register 49 and this address is called IA. The instruction partitioning unit 37 uses two fields, a first instruction line field or instruction code field 51 and a second instruction line field 53, holding 128 bits or eight words each, called WORDBDATA and PACKDATA respectively, the first field being directly obtained from the instruction cache memory 45 and the second field being stored in a physical register. A pointer 55 holds an indicator pointing to the start of the actual instruction processed in the concatenated or combined instruction line field of 256 bits obtained from the fields WORDBDATA and PACKDATA 51, 53, the field PACKDATA containing the least significant portion of the 256 bits, and receives its start value, for example when a jump will or has been made, from the instruction register 49, in that case always the instruction buffer 45 being loaded with a new line of words from the program memory 7 and this line then being transferred to the high or most significant portion WORDBDATA 51 of the combined instruction line field 51, 53. A control unit 57 controls the loading of the register holding the second instruction line field PACKDATA 53, moving the whole line in the first instruction line field WORDBDATA 51, if required, to the second instruction line field PACKDATA 53, what for example happens when an instruction extends over the border between two successive 128 bit lines of program code. Another control unit 58 controls the address of the current instruction processed, the address being stored in the register 49, and it also controls the value of the pointer 55.

The partitioning unit 37 determines the instruction length in its execution block 59 for making the very partitioning by inspecting the bits in the combined instruction line field 51+53 at the pointer 55, which can be made very rapidly since no decoding is required owing to the simple format of the instruction length information in the operation code field. In the partitioning block 59 it is thus determined in a block 61 whether none, one or two successive instructions are available in a considered clock cycle, the instruction lengths of the instructions are simultaneously determined in a block 63 and if possible, one or two instructions are delivered to output registers 65, 67 in the same clock cycle.

In the partitioning unit 37 it is also detected in a block 69 whether the instructions contain a memory reference such as an a-parameter and whether they are jump instructions, i.e. whether they contain an n-parameter, by testing the appropriate bit position No. 3 for a-parameters and bit position No. 4 in the case where the instruction length is at least two words. The respective a- or n-parameters are extracted by first testing the appropriate bit positions indicating their lengths and then transmitting an a-parameter directly to memory handling circuits 71 and an n-parameter to the control unit 43 of the considered path respectively.

In the instruction decoding unit 39 other parameters such as register references are extracted in a unit 73. The operation code of the instruction is extracted in a block 75, which thus makes a decoding of the ten least significant bits of the instruction, using these bits as an input address of a decoding table 77, listing the addresses of the microcode instructions to be actually used by the ALU 35. The determined addresses are transmitted to a buffer 79 for four microinstructions in the buffer unit 41.

The two pipelining paths A and B are joined by a selector unit 81, receiving commands from the control units 43 of the paths, the selector unit selecting the correct path for next instruction depending on the result of executed/predicted jump instructions, sending the next instruction to the execution unit 33. The memory references are handled by a memory handler 73 receiving instructions from the buffer control 47 for delivering a new successive line of program code, from the path control units 43 to access a place in the program memory 7 for finding a reference to the data memory 11 and to access a new line of program code at a quite new position in the program memory 7. The indirectly referenced data stored in the data memory 11 are then delivered to the execution unit 33 and placed in a data queue 83 therein. This queue 83 corresponds to an instruction queue 85 storing the next microinstructions to be executed, receiving the addresses of the microinstructions from the selector 81. A register file 87 is connected to the ALU 35 holding a multitude of rapidly accessible registers in the conventional way.

The operation of the partitioning block 59 of FIG. 3 will now be described in somewhat greater detail with reference to the block diagrams of FIGS. 5a and 5b and the pictures of FIGS. 5c–5h illustrating the steps executed in instruction partitioning. It is to be understood that all units of the assembler translating unit 31 work in parallel with each other, comprising mostly combinatorial and similar circuits and only a few registers, in order to save processing time. The partitioning unit 59 uses the two instruction line or instruction code fields WORDBDATA and PACKDATA 51, 53 making up the combined instruction line field. When the partitioning of instructions is started, one line or 128 bits in the buffer 45 are set to constitute the instruction line field WORDBDATA 51 and simultaneously the pointer 55 is set, here called POINTERX, holding 4 bits pointing to the first instruction to be decoded in the combined instruction line field. In setting the pointer 55 the two instruction line fields WORDBDATA and PACKDATA 51, 53 are as described above considered as one instruction line field of 256 bits, PACKDATA containing the least significant portion of the 256

The bits Nos. 0–2 of each word in the concatenated instruction code lines are provided to a selector 101, which is controlled by the value of the pointer 55, POINTERX. Thus the bits Nos. 0–2 of the next instruction will be provided by the selector 101 to a combinatorial circuit 103. This is a fairly simple logic circuit also receiving as input the value of POINTERX. As outputs it generates three signals, a simple first signal on a line 105 indicating that all words of the next instruction, here also called the x-instruction, are not contained in the combined instruction line field WORDBDATA, PACKDATA, and a second signal ILX of two bits on a line 107 indicating the length of the instruction. The instruction length signal ILX and the value of POINTERX are provided to another combinatorial circuit 109. This combinatorial circuit provides an output signal controlling a selector circuit or multiplexer 111 and indicating to it those words which form the next instruction, the x-instruction. The multiplexer 111 receives as inputs lines from all positions in the combined instruction line field WORDBDATA, PACKDATA and delivers the selected words right-aligned to the x-instruction register 77 of 64 bits or equivalently 4 words, resetting possible unused, higher-order words to contain only zeroes.

Figure 5A:
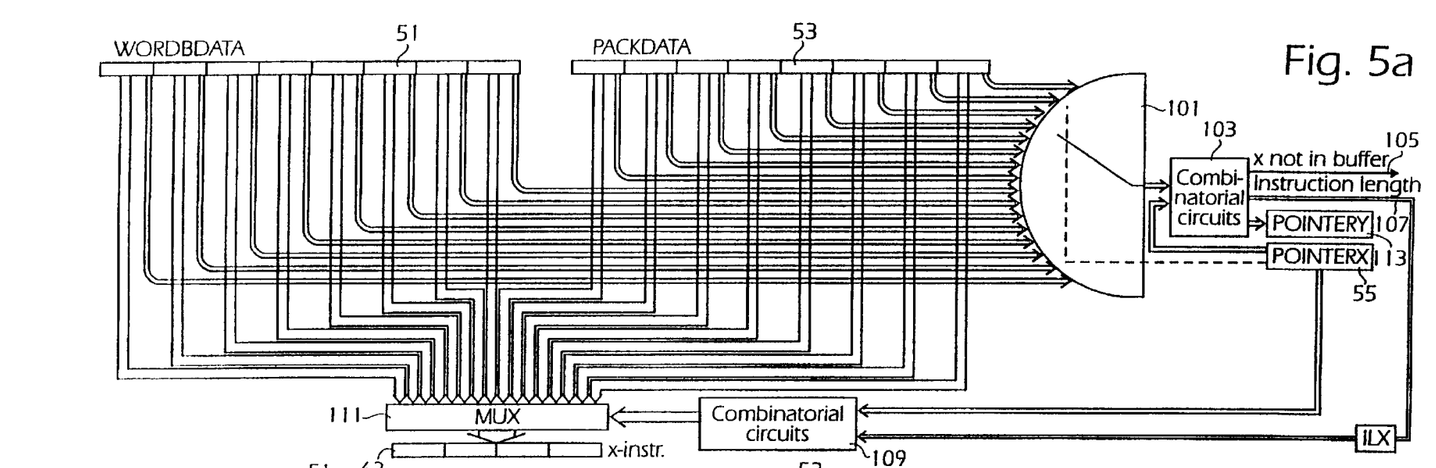
FIGS. 5a and 5b are block diagrams illustrating rapid determination of instruction lengths and delivery of instructions for finding microinstructions.
Figure 5B:
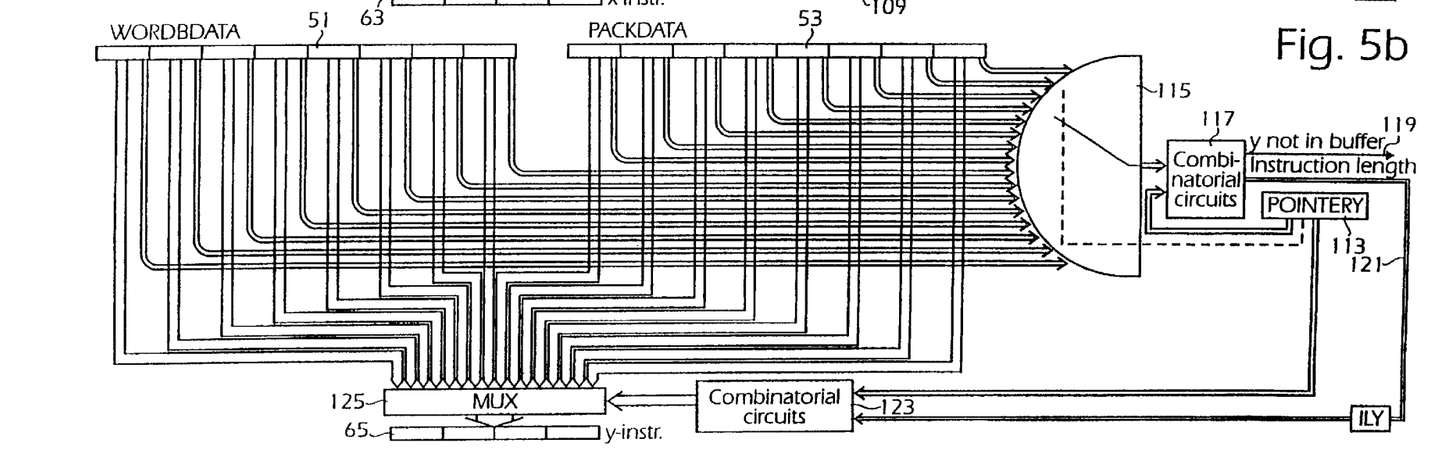

In the same clock cycle the next successive instruction, here called the y-instruction, can be found, as illustrated in FIG. 5b. The combinatorial circuit 103 shown in FIG. 5a outputs as a third signal a pointer indicating the start of the next successive instruction after the x-instruction, this pointer being called POINTERY and symbolically indicated by the block 113 in FIGS. 5a and 5b. The y-instruction and its length are determined substantially in the same as for the x-instruction. Thus, a multiplexer 115 receives on its outputs bits Nos. 0–2 of all words in the combined instruction line field 51, 53 and outputs these bits from the word selected by the signal POINTERY. These selected bits are together with the position indicator POINTERY provided to a combinatorial circuit 117. This circuit 117 provides as a first signal on a line 119 an indication whether the y-instruction will not be available in the output register 65, i.e. whether the whole y-instruction is not contained in the combined instruction line fields, and a second signal ILY on a line 121 indicating the length of the y-instruction. The signal POINTERY and the signal ILY are both provided as inputs to a combinatorial circuit 123 controlling a selector 125. The combinatorial circuit 123 provides as outputs signals to the selector indicating those words in the combined instruction line field 51, 53 which are compressed in the y-instruction. The selector 125 receives as inputs lines from all 256 positions of the combined instruction line fields 51, 53 and outputs the y-instruction to the y-instruction register 65, fight-aligned and filed with higher-order zeroes if needed.

The signals/values POINTERX, POINTERY, ILX on line 107, ILY on lie 121 and those on the output lines 105, 119 indicating whether an x- and y-instruction respectively are not available, are all provided to the control unit 57, see FIG. 3, for controlling the transfer of the contents of WORDBDATA to PACKDATA and of a new program line from the instruction buffer 45 to the first program code line field WORDBDATA 51.

Figure 5C:
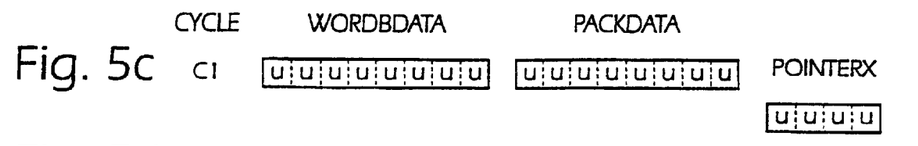
FIGS. 5c–5h are pictures illustrating the steps executed when finding instruction lengths and delimiting instructions of varying lengths.
Figure 5D:
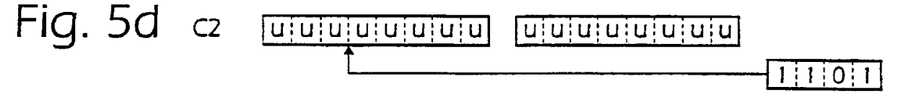
Figure 5E:
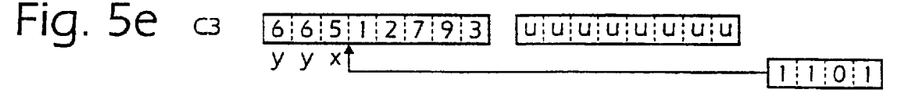
Figure 5F:
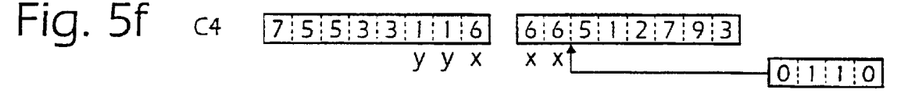
Figure 5G:
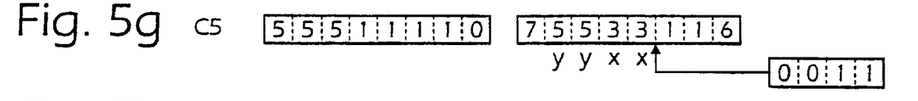
Figure 5H:
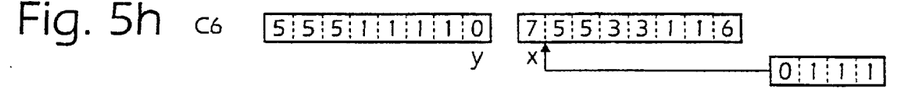

In FIGS. 5c–5h is illustrated the start of processing the register lines for extracting the instruction. In cycle C1 as shown in FIG. 5c all fields or registers WORDBDATA, PACKDATA, POINTERX contain undefined data. In the next cycle C2, as shown in FIG. 5d, the value of POINTERX is set by taking the three least significant bits of the value of the current instruction address pointer in the register 49, this value also call IA, and by adding a leading 1 before these bits. Here also the correct line of the instruction cache is set to constitute the field WORDBDATA, to which IA points. In cycle C3, see FIG. 5e, a one-word instruction is found as the x-instruction of this cycle. An y-instruction can not be delivered since it has a length of three words and its most significant word is not contained in WORDBDATA. In the next cycle C4, shown in FIG. 5f, the contents of WORDBDATA are moved to PACKDATA and a new program code line is accessed from the instruction buffer 45 and assigned to the first code line field WORDBDATA 51. In this cycle C4 two instructions can be delivered, an x-instruction and an y-instruction, the x-instruction being the three word y-instruction of the preceding cycle C3 and the y-instruction having a length of two words. However, the next instruction starts in WORDBDATA and therefor in the next cycle C5, see FIG. 5b, the contents of WORDBDATA are moved to PACKDATA and a new line of program code is loaded into WORDBDATA. In this cycle C5 two two-word x- and y-instructions are partitioned and provided to be decoded. In the next cycle C6 also x- and y-instructions are partitioned, as shown in FIG. 5h. In the next cycle again, the contents of WORDBDATA will be moved to PACKDATA and a new program code line is moved to WORDBDATA.

Figure 6A:
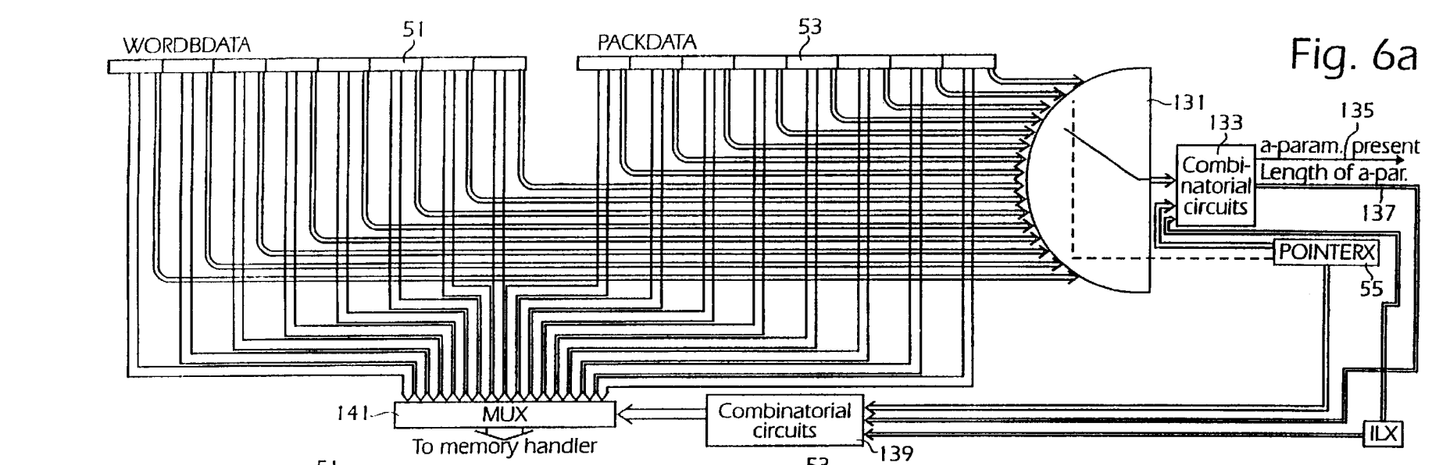
FIGS. 6a and 6b are block diagrams illustrating rapid access of memory addresses.
Figure 6B:
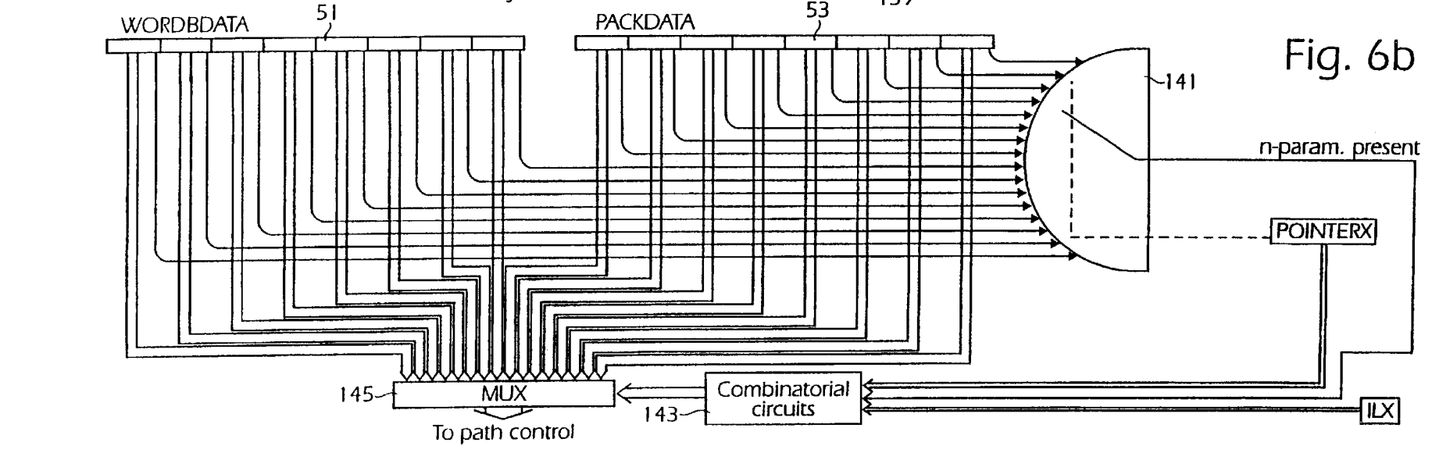

The detection and extraction of parameters in the block 69 in FIG. 3 are illustrated by the block diagrams of FIGS. 6a and 6b respectively. The processing is made by using combinatorial and similar circuits and is analogous to the processing made in finding the instruction lengths and partitioning into individual instructions as described with reference to FIGS. 5a and 5b. Thus, for detecting and extacting an a-parameter, bit positions Nos. 2, 3 and 5 of each word in the combined instruction line fields WORDBDATA and PACKDATA are connected to the inputs of selector 131, controlled by the value of POINTERX. The bits in the appropriate word are provided to an input of a combinatorial circuit 133, receiving as inputs also the value of POINTERX and the instruction length signal ILX. The combinatorial circuit 133 outputs a signal on a line 135 indicating whether an a-parameter is present and another signal on a line 137 indicating the length of the a-parameter, if any. The length signal and the values of POINTERX and ILX are all provided to inputs of a combinatorial circuit 139, which uses the received signals for controlling a multiplexer or selector 141, which extracts the a-parameter from the correct positions in the combined instruction line fields WORDBDATA and PACKDATA and transmits it to the memory handler.

The extraction of an n-parameter is illustrated in FIG. 6b and here bit positions No. 4 of all words in the combined program code instruction line fields WORDBDATA and PACKDATA are connected to the inputs of a selector 141, controlled by the value of POINTERX. The selected signal from this bit position in the first word of the x-instruction is provided to an input of a combinatorial circuit 143, which also receives as input signals the values of POINlERX and the determined instruction length ILX. The combinatorial circuit 143 controls a selector 145 to select the bit positions containing the n-parameter in the considered x-instruction, the selector 145 receiving as inputs the values of all bit positions in the combined long instruction code field. The extracted n-parameter is provided to the control of the path in which the processing is made.

For detecting and extracting parameters from the y-instructions circuits similar to those illustrated in FIGS. 6a and 6b are used, in which only the value of POINTERX is replaced by the value of POINTERY and the value of ILX is replaced by the value of ILY.

Figure 7A:
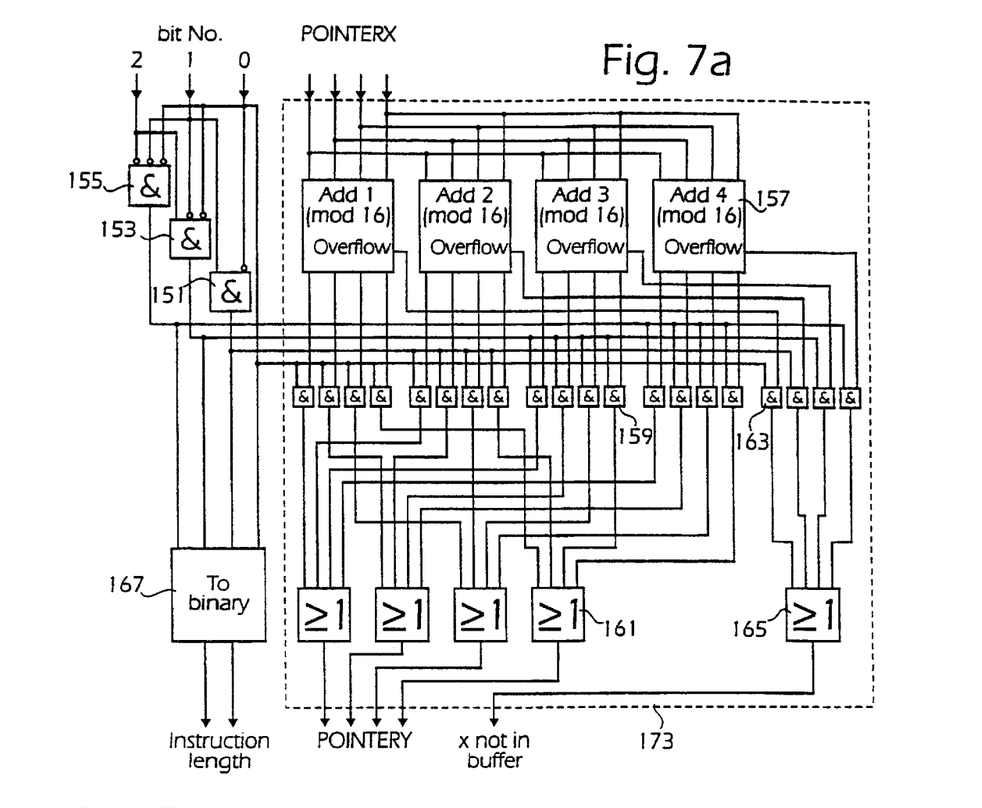
FIG. 7a is circuit diagram illustrating part of the instruction length decoding and position determination in the processor of FIG. 3, and FIGS. 7b and 7c are circuit diagrams illustrating the instruction length decoding and position determination for a processor adapted to execute non-remapped instructions.

In FIG. 7a a circuit diagram of the combinatorial circuit 103 shown in FIG. 5a is illustrated. The incoming lines of the circuit 103 comprise bits Nos. 0–2 of the word pointed to by POINTERX. The lines carrying the bits Nos. 0–2 are connected to three AND-gates 151, 153, 155, the individual input lines being connected to suitable non-inverting or inverting inputs of the respective gate. On the output of the AND-gates signals are provided which when having a logical level indicating a logical "1" tells that the x-instruction comprises two, three or four words respectively. The line from bit position No. 0 always carries a signal indicating, for a high logical level of the signal, that the instruction length is one word.

Four lines carrying the signal POINTERX are input to four logical networks 157, each performing an addition modulo 16, to the binary number represented by the input signals. They add the respective possible instructions lengths of 1, 2, 3 and 4 to the input binary number. These networks then include at most about 25 logical gates each. The output lines of the networks are connected to selecting AND-gates 159, the other input of which is connected to the respective one of the lines carrying the signals indicating the instruction length. The output lines of the AND-gates 159 which carry the same position of the binary results of the additions are connected to an OR-gate 161, so that four such OR-gates 161 are provided. The output lines of the OR-gates 161 then provide the rest of the addition of the instruction length to the value of POINTERX, which is the desired value POINTERY. The adding networks 157 also provide on output lines signals signifying overflow in the addition, i.e. that the result of the addition is equal to 16 or more. These output lines are connected to one input of selecting AND-gates 163, the other input of which being connected to the lines carrying the signals indicating the instruction length. The output lines of these AND-gates 163 are connected to an OR-gate 165, which thus on its output line provides the desired signal "x not in buffer".

The lines carrying the signals indicating the instruction length are also connected to a combinatorial network 167 converting the signals to a standard binary shape, so that the two output lines of the network 167 thus provide the signal "Instruction length" or ILX, as discussed with reference to FIG. 5a.

Figures 7B, 7C:
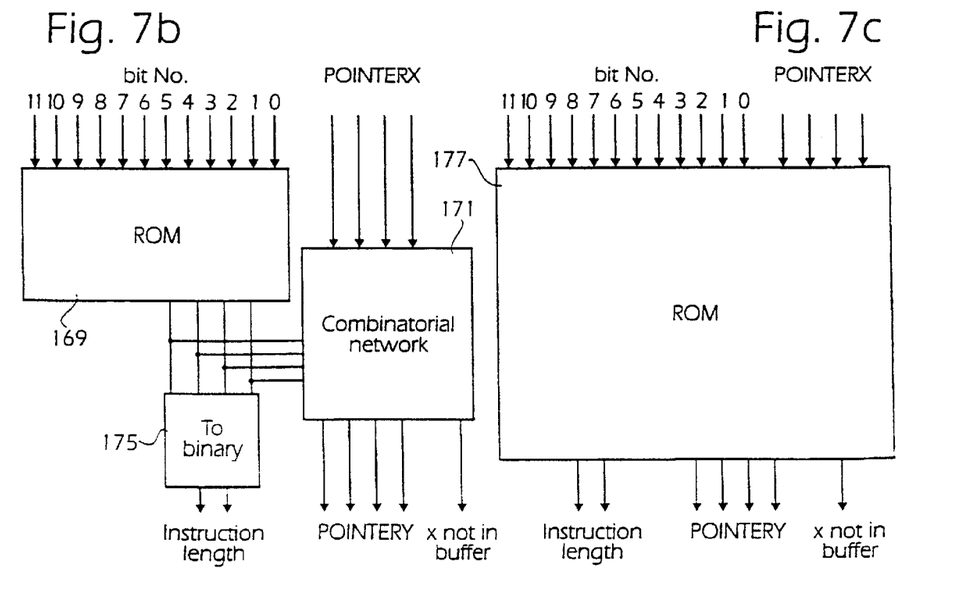

If a remapping of the instructions of the original program code was not made and thus the instructions did not use the simple way of coding the instruction length as described above, the entire operation code must be used for determining the instruction length. A circuit diagram illustrating this case is shown in FIG. 7b. If the operation code e.g. is assumed to comprise twelve bits, all these twelve bits must be decoded, e.g. by using a ROM 169. On the output lines of this circuit are the instruction length signals provided, which are then also used as inputs to a combinatorial circuit 171 for determining POINTERY and the signal "x not in buffer". This second combinatorial circuit may be equal to the circuit 173 within the dashed line in FIG. 7a. The signal "Instruction length" is generated by a combinatorial circuit 175 connected and constructed in the same way as the combinatorial circuit 167 of FIG. 7a. An alternative is to use instead a single ROM 177 making all decoding in one step, as illustrated in FIG. 7c, having as inputs the operation code bits Nos. 0–11 and POINTERX and as outputs all the desired signals "Instruction length", POINTERY and "x not in buffer".

The circuit illustrated in FIG. 7a contains approximately (3+4.25+5·4+5+32)=160 gates and operates very fast. The circuit of FIG. 7b contains approximately 157 gates and a number of ROM cells of the magnitude of order of $2^{12} \cdot 4 = 16384$ and operates slowly, the decoding in the ROM requiring an extra clock cycle. The circuit of FIG. 7c contains approximately $2^{16 \cdot 7} = 458752$ ROM cells and operates slowly. It is thus concluded that using the remapping scheme as described herein, the execution in the pipelines can be made very fast, allowing that the decoding of two instructions can be made in one clock cycle.

Figure 4:
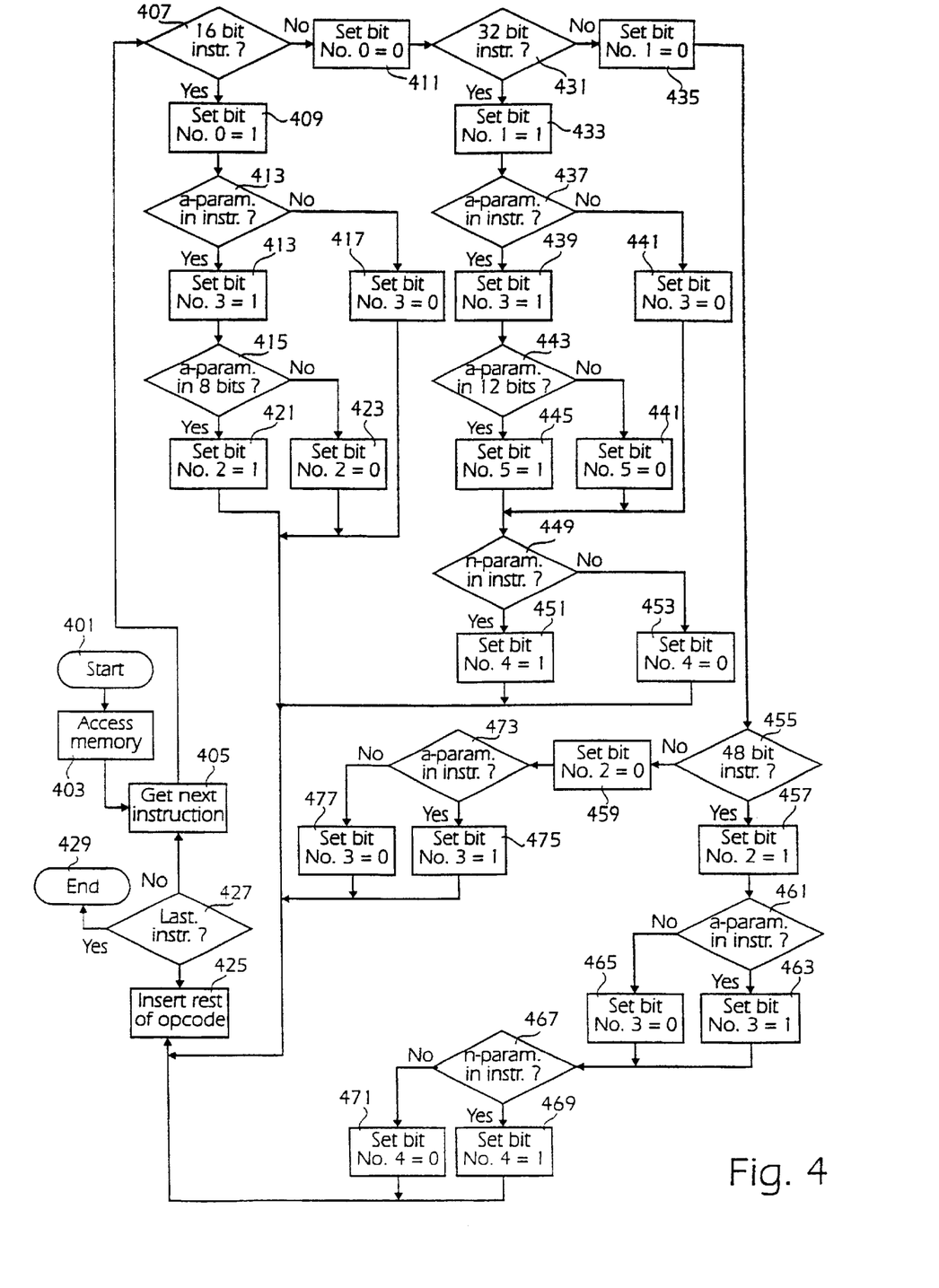
FIG. 4 is a flow chart illustrating different steps executed in a device for code remapping.

In FIG. 4 a flow chart is shown, illustrating some of the different steps which could be carried out in a device 5 for remapping code. The remapping is preferably performed by making a tablelook-up, but the flow diagram of FIG. 4 still illustrates some of the basic points in the remapping procedure.

Thus, from a start block 401 in FIG. 4, a program to be remapped is accessed in a block 403. The first or next instruction in the program is then determined in a block 405. Then the actual remapping starts and then the new instruction is first set to include only binary zeroes which is thus always made when starting the remapping of an instruction. In a next block 407 it is decided whether the instruction is a 16-bit instruction. If the result of the decision is positive, the procedure proceeds to a block 409 and if the result of the decision is negative the procedure proceeds to a block 411. In the block 409 the first bit in the instruction from the right hand side, i.e. bit No. 0, is set, i.e. it is set to a binary "1".

From the block 409 the procedure continues to a block 413. In this block 413 it is determined whether the considered instruction is an instruction holding an a-parameter. If the determination in the block 413 gives the answer "Yes" the procedure proceeds to a block 415, and otherwise, if the determination in the block 413 gives the answer "No", the procedure proceeds to a block 417. In the first block 415 of these two result blocks the fourth bit, bit No. 3, of the instruction is set, i.e. is set to a binary "1", and the procedure then continues in a block 419.

In the block 419 it is decided whether the a-parameter of the instruction is an 8-bit parameter. In the case where the result of the decision in the block 419 is that there is an 8-bit parameter in the instruction, the procedure proceeds to a block 421, and otherwise if it is decided in the block 419 that the a-parameter has not eight bits, the procedure proceeds to a block 423. In the block 421 the third bit, bit No. 2, of the instruction, is set, i.e. is set to a binary "1" and the procedure proceeds to a block 425. In the block 423 the third bit, bit No. 2, of the instruction is reset, i.e. is set to a binary "0" and the process proceeds to a block 425.

If the procedure continues from the block 413 to the block 417, i.e. in the case where the decision in the block 413 is that there is no a-parameter in the instruction, the fourth bit, bit No. 3, of the instruction is reset, i.e. is set to a binary "0" in the block 417, and the process then proceeds to the block 425.

In the block 425, additional information on the operation code of the instruction is inserted in the modified instruction in order to make the new operation code unique to the considered instruction, e.g. by a table look-up procedure, and the modified instruction is stored in the memory, whereafter the procedure proceeds to a block 427.

In the block 427 it is determined whether the processed instruction is the last instruction of the original program. If it is determined that it is the last one, the procedure is finished in an end block 429, and if it is determined that it is not the last instruction, the process proceeds to the block 405, in which the next instruction of the original program is fetched and then the whole remapping procedure starts over again.

If it was decided in the block 407 that the considered instruction is not a one-word instruction, the procedure proceeds to the block 411, in which the first bit in the instruction, bit No. 0, is set and next a block 431 is executed. In the block 431 it is decided whether the instruction is a 32-bit instruction. If it is decided that the instruction is a 32-bit instruction, a block 433 is executed and if it is decided that it is not a 32-bit instruction, instead a block 435 is executed. In the positive result block 433 the second bit in the instruction, bit No. 1, is set.

From this block 433 the execution of the procedure proceeds to a block 437. In this block 437 it is determined whether the instruction contains an a-parameter. If the result of the determination in the block 437 is that the instruction contains an a-parameter, a block 439 is next executed, and else, if it is determined in the block 437 that there is no a-parameter in the instruction, the procedure will next execute a block 441. In the block 439 the fourth bit, bit No. 3, of the instruction is set and then the procedure proceeds to a block 443. In the block 443 it is decided whether the a-parameter is a 12-bit parameter. If the decision in the block 443 gives a positive answer, i.e. that the a-parameter is found in a field of twelve bits, the procedure proceeds to a block 445, and otherwise, if the decision in the block 443 gives a negative answer, a block 447 will next be executed. In the block 445 the sixth bit, bit No. 5, of the instruction is set and then the procedure proceeds to a block 449. In the block 447 the sixth bit, bit No. 5, of the instruction is instead reset and then the procedure proceeds to the block 449.

If the block 441 is executed next after the block 437, i.e. in the case where the decision in the block 437 was that the instruction had no a-parameter field, the fourth bit, bit No. 3, of the instruction is reset in the block 441, and then the procedure proceeds to the block 449. In the block 449 it is decided whether the instruction contains an n-parameter. If it is decided in the block 449 that the instruction includes an n-parameter, the process proceeds to a block 451, in which the fifth bit, bit No. 4, of the instruction is set and else, if the result of the decision in the block 437 was that there is no n-parameter in the instruction, the procedure proceeds to a block 453, in which the fifth bit, bit No. 4, of the instruction is reset. Thereupon the process proceeds from the blocks 451 and 453 to the block 425.

If the decision in the block 431 was that the instruction is not a two-word instruction, the block 435 is executed, in which the second bit in the instruction, bit No. 1, is reset. The procedure then continues to a block 455. In this block 455 it is determined whether the instruction is a 48-bit instruction. If it is a 48-bit instruction, in the procedure next a block 457 is executed and in the case where it is not, a block 459 is executed. In the block 457 the third bit of the instruction, bit No. 2, is set. From the block 457 the procedure proceeds to a block 461. In this block 461 it is decided whether the instruction holds an a-parameter. If it is decided in the block 461 that the instruction has an a-parameter, a block 463 is executed, and else a block 465 is executed. In the block 463 the fourth bit, bit No. 3, of the instruction is set and then a block 467 is executed. If, on the other hand, the procedure proceeds from the block 461 to the block 465, i.e. in the case where it is decided that the instruction holds no a-parameter, the fourth bit, bit No. 3, of the instruction is instead reset in the block 465, and then the block 467 is executed.

In the block 467 it is decided whether the instruction contains an n-parameter. If there is a positive result of the decision in this block 467, i.e. in the case where the so instruction contains an n-parameter, a block 469 is executed, in which the fifth bit, bit No. 4, of the instruction is set, and else, if the decision in the block 467 gave a negative result, a block 471 is executed, in which the fifth bit, bit No. 4, of the instruction is reset. Thereupon the procedure proceeds from the blocks 451 and 453 to the block 425.

If it was decided in the block 455 that the instruction is not a 48-bit or three-word instruction, the block 459 is executed, in which the third bit of the instruction, bit No. 2, is reset and then a block 473 is executed. In this block 473 it is determined whether the instruction contains an a-parameter. If it is determined in the block 473 hat the instruction contains an a-parameter, the procedure proceeds to a block 475, and otherwise the procedure proceeds to a block 477. In the block 475 the fourth bit, bit No. 3, of the instruction is set and then the block 425 is executed as described above. If, on the other hand, the procedure proceeds from the block 473 to the block 477, i.e. that the outcome of the decision in the block 473 was that there is no a-parameter in the instruction, the fourth bit, bit No. 3, of the instruction is set in the block 477, whereupon the procedure proceeds to the block 425 which is executed as described above. The 64-bit instructions of the original code cannot have an n-parameter in the embodiment described herein and thus no tests of the existence thereof are needed.

The use of the remapping as described herein makes it possible to execute, in a manner which is very efficient in terms of run time for a program, instructions in a processor designed for fixed length instructions. Also, the method makes the decoding of instructions efficient. This is due to the fact that, since the instruction length can be read directly from the operation code it appears that in the embodiment described herein it is possible to translate two instructions during the same clock cycle. That is, without having this knowledge, it would be necessary to perform a table look-up for determining its length.

What is claimed is:

1. A digital processor, comprising:
   an ALU-unit for execution of instructions, and
   a program code translation unit including:
   an instruction partitioning unit having an instruction buffer for storing instructions fetched from a memory,
   an instruction decoding unit for receiving partitioned instructions from the instruction partitioning unit, decoding a received instruction to find an operation code and parameters, and translating the operation code to one or more microinstructions, the instruction decoding unit being connected to the ALU-unit forwarding microinstructions thereto, the instruction decoding unit including a parameter and operand extraction unit for sensing at least one first bit located at a first definite place as counted from a predetermined position of an instruction and taking the value of the sensed at least one first bit to indicate whether or not the instruction contains a parameter or an operand of a type associated with the definite place as counted from the predetermined position of the instruction.

2. A digital processor according to claim 1, wherein the parameter and operand extraction unit is arranged to sense whether or not the at least one first individual bit is set, taking the fact that the at least one first bit is sensed to be set to indicate that the instruction contains a parameter or an operand of a predetermined type and taking the fact that the at least one first bit sensed not to be set to indicate that the instruction does not contain a parameter or an operand of the Predetermined type.

3. A digital processor according to claim 1, wherein the parameter and operand extraction unit is arranged to sense at least one second bit located at a definite second place as counted from the predetermined position of an instruction, the second place being different from the first place, taking the value of the sensed at least one second bit to indicate the length of a parameter or an operand of a type associated with the definite place as counted from the predetermined position of the instruction or does not contain a parameter of this type, in the case where the parameter and operand extraction unit has indicated that the instruction contains the parameter or the operand respectively.

4. A digital processor according to claim 3, wherein the parameter and operand extraction unit, in sensing whether the at least one second bit is set or is not set, is arranged to take the fact that the at least one second bit is sensed to be set to indicate that the parameter or operand respectively has a first length and to take the fact that the at least one second bit is sensed not to be set to indicate that the parameter or operand respectively has a second length different from the first length.

5. A digital processor comprising:
a program code translation unit for decoding instructions including:
an instruction partitioning unit having:
an instruction buffer for storing instructions fetched from a memory, and
an instruction length detection unit for sensing a bit value of one of plural predetermined bit positions of an instruction in the instruction buffer, wherein each of the predetermined bit positions corresponds to a different instruction length, and determines the length of the instruction directly from the sensed value at the predetermined bit position, and
an instruction decoding unit for receiving partitioned instructions from the instruction partitioning unit and decoding a received instruction to find an operation code and parameters and translating the operation code to one or more microinstructions; and
an ALU-unit for receiving and executing the one or more microinstructions.

6. The digital processor of claim 5, wherein the instruction length detection unit is arranged to determine the length of the instruction without having to decode the bit value sensed at the predetermined bit position.

7. The digital processor of claim 5, wherein the instruction length detection unit is arranged to determine the length of the instruction based on a count from a start position of the instruction in the instruction buffer to the predetermined bit position.

8. The digital processor of claim 7, wherein the predetermined bit positions are located consecutively or successively from the predetermined position of the instruction.

9. The digital processor of claim 5, wherein the instruction length detection unit is arranged to determine that a first bit value at the at least one predetermined bit position means that the instruction has a first length and that a second bit value at the at least one predetermined bit position means that the instruction has a second length different from the first length.

10. The digital processor of claim 5, wherein the instruction length detection unit, after sensing the value of the at least one predetermined bit, is arranged to determine the length of the instruction as indicated by a specific bit being set or not in a subfield of the operation code of the instruction, the other bits of the subfield not being set.

11. The digital processor of claim 5, wherein the instruction length detection unit, after sensing the value of the at least one predetermined bit, is arranged to determine the length of the instruction as indicated by a specific bit being set or not in a subfield of the operation code of the instruction, all the bits in the subfield as taken in one direction from the specific bit not being set.

12. A digital computer, comprising:
first memory,
a program memory for storing instructions organized in one or more programs, and
a central processing unit coupled to the program memory including:
a decoder for decoding ones of the instructions before those instructions are executed, and
a remapper, coupled to the first memory and to the program memory, for executing part of the decoding of instructions during a load of a program from the first memory to the program memory, wherein while executing part of the decoding of an instruction, the remapper is configured to add information to an operation code field of the instruction.

13. The digital computer of claim 12, wherein the information directly indicates the length of the instruction.

14. The digital computer of claim 12, wherein the information directly indicates whether the instruction is a jump instruction.

15. The digital computer of claim 12, wherein the information directly indicates whether the instruction contains a parameter for memory access.

16. The digital computer of claim 12, wherein the information directly indicates the existence of an operand in the instruction.

17. The digital computer of claim 12, wherein information directly indicates the length of an operand.

18. The digital computer of claim 12, wherein the information directly indicates the position of an operand.

19. The digital computer of claim 12, wherein the remapper is arranged to preserve the original length of the instruction when adding or changing the operation code field.

20. The digital computer of claim 12, wherein the remapper is arranged to first determine the length of the instruction and then to add to or change the operation code field so that the length of the instruction is indicated by a specific bit being set or not in subfield of the operation code field, other bits of the subfield not being set.

21. The digital computer of claim 12, wherein the remapper is arranged to first determine the length of the instruction and then to add to or change the operation code field so that the length of the instruction is indicated by a specific bit being set or not in the operation code field, and wherein all the bits in the operation code field in one direction from the specific bit to a predetermined position not being set.

22. The digital computer of claim 12, wherein the remapper is arranged to add to or change the operation code field so that the existence of a specific operand in the instruction is indicated by a bit being set or not.

23. A device for remapping an operation code of a retrieved instruction to be provided to a digital processor, the device comprising electronic circuitry configured to perform the following tasks: determine one or both of the length of the retrieved instruction and the existence of a parameter or of an operand in the retrieved instruction, and set or reset one or several predetermined bits of the operation code to a predetermined binary pattern depending on the outcome of the determination to generate a remapped instruction, wherein a length of the remapped instruction is the same as the retrieved instruction.

24. The device of claim 23, wherein a bit position of a first set of plural bit positions in an operation code is set depending on the determined instruction length, and a bit position of a second set of plural bit positions in an operation code is set when the existence of a parameter or of an operand in the instruction is determined.

25. The device of claim 23, wherein the electronic circuitry is configured further to determine the length or position of the certain parameter or operand and set or reset one or several other predetermined bits of the operation code to a predetermined pattern of binary ones and binary zeroes depending on the determined length or position of the certain parameter or operand.

26. A method of remapping a retrieved instruction having an operation code, comprising:

determining one or both of a length of the retrieved instruction and an existence of a parameter or an operand in the retrieved instruction, and setting or resetting one or several predetermined first bits of the operation code of the retrieved instruction to a predetermined binary pattern depending on the outcome of the determination to generate a remapped instruction.

27. The method in claim 26, wherein a length of the remapped instruction is the same as the retrieved instruction.

28. The method of claim 26, further comprising.

determining the length or position of a parameter or of an operand of the retrieved instruction, and setting or resetting one or several predetermined second bits of the operation code, the second bits being different from the first bits, to a predetermined pattern of binary ones and binary zeroes depending on the outcome of the determination of the length or position.

29. A method of decoding instructions in a computer system, comprising:

loading instructions into a first memory, loading the instructions from the first memory to a program memory of the computer system, providing the instructions from the program memory to a pipelining unit in a central processing unit in the computer system, and decoding the instructions in the pipelining unit before executing the instructions in the central processing unit, wherein part of the instruction decoding is performed during the load of a program from the first memory to the program memory.

30. The method of claim 29, wherein when performing the part of the instruction decoding, information is added to the operation code field of the instruction regarding one or more items selected among:

instruction length;

whether the instruction is a jump instruction;

whether the instruction contains a memory access;

the existence of an operand in the instruction;

the length of an operand; and the position of an operand.

31. The method of claim 29, wherein when performing the part of the instruction decoding, the operation code field of an instruction is changed so that a subfield of the operation code field directly indicates one or more items selected among:

the length of the instruction;

whether the instruction is a jump instruction;

whether the instruction contains a parameter for memory access;

the existence of an operand in the instruction;

the length of an operand; and the position of an operand.

* * * * *